May 29, 1956 MOTOHARU KURATA 2,747,279
STOP DEVICE FOR AUTOMATIC GLASS CUTTING
APPARATUS FOR CROSS CUTTING
Filed Jan. 5, 1953 3 Sheets-Sheet 1

INVENTOR.
Motoharu Kurata
BY Richards & Geier
ATTORNEYS

May 29, 1956

MOTOHARU KURATA 2,747,279

STOP DEVICE FOR AUTOMATIC GLASS CUTTING
APPARATUS FOR CROSS CUTTING

Filed Jan. 5, 1953

INVENTOR.
Motoharu Kurata

BY *Richards Geier*

ATTORNEYS

INVENTOR.
Motoharu Kurata

BY Richards & Geier
ATTORNEYS

United States Patent Office

2,747,279
Patented May 29, 1956

2,747,279

STOP DEVICE FOR AUTOMATIC GLASS CUTTING APPARATUS FOR CROSS CUTTING

Motoharu Kurata, Shibuya-ku, Tokyo, Japan, assignor to Asahi Garasu Kabushiki Kaisha, Tokyo, Japan, a corporation of Japan Application January 5, 1953, Serial No. 329,504

5 Claims. (Cl. 33—32)

The present invention relates to a stop device for automatic glass cutting apparatus for cross cutting or scoring.

An object of the present invention is to provide a stop device for automatic glass cutting apparatus for cross cutting capable of always keeping constant the relative position between the glass plate loaded at the predetermined position on a conveyor and the glass cutting or scoring tool for cross cutting.

Another object of the present invention is to make economically cross cutting or scoring at the accurate cutting position relative to the glass plate to be cut so that inutile edge portions to be trimmed off may be substantially eliminated or reduced to a minimum.

Further objects, features and advantages of the present invention will be seen from the following detailed description.

In the prior glass cutting apparatus for cross cutting, in which the glass plate to be cut is carried on the conveyor, which is intermittently stopped for the cross cutting operation, the stop position for the running conveyor though nearly fixed varies to some extent. With a result, the cross cutting or scoring is difficult to perform at the accurate position, because the position of glass plate deviates due to inertia of the conveyor and the like even when it is loaded on a normal predetermined position. Therefore, it is necessary always to provide surplus edge portions to be trimmed off.

The present invention is to provide a stopping device for use in the cross cutting or scoring operation of a glass plate at an accurate cutting position, in which the cross cutting or scoring is carried out by always keeping coincident the relative stopping position of an intermittently moving conveyor loaded with the glass plate to be cut at the predetermined position with a guide frame on which a cross cutting bed equipped with a cross cutting or scoring device is slidably mounted, that is, by always keeping constant the relative position between the glass plate disposed as predetermined on the conveyor and the cross cutting or scoring tool for glass plate, immediately before the conveyor loaded at the predetermined position with the glass plate to be cut and running intermittently stops at the cross cutting position. Hence, according to the present invention, an extremely economical glass plate cutting can be carried out by substantially eliminating edge portions to be snapped off or reducing the inutile to a minimum.

In order that the present invention may be more clearly understood, one embodiment thereof will now be described, by way of example, with reference to the accompanying drawings, in which:

Fig. 1a and Fig. 1b together constitute a side elevation of the automatic glass cutting apparatus for cross cutting equipped with a stop device according to the invention;

Fig. 2a and Fig. 2b comprise a plan view thereof;

Figure 1A:
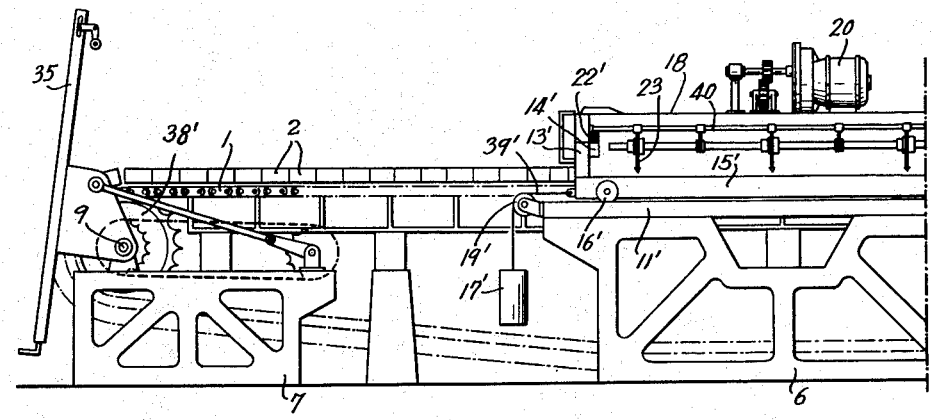
Figure 2A:
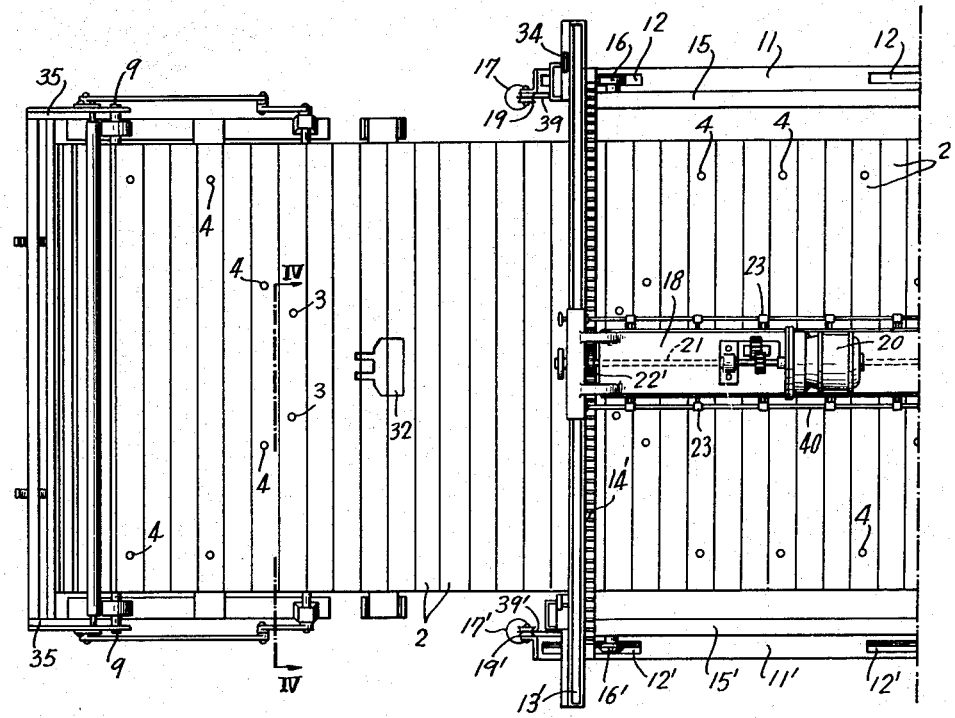
Figure 1:
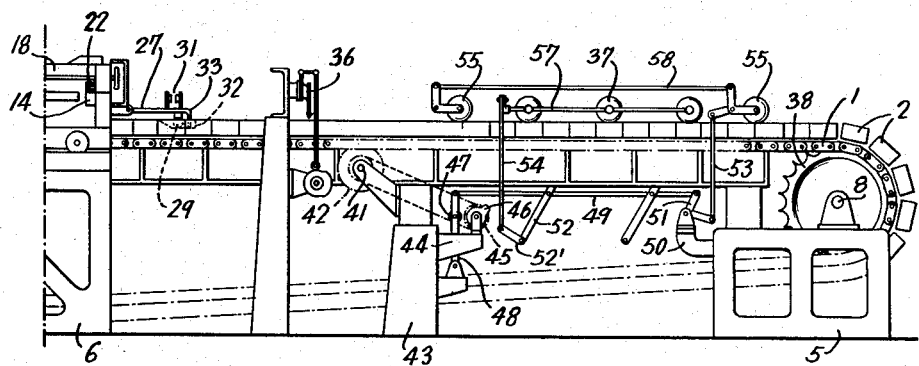
Figure 2:
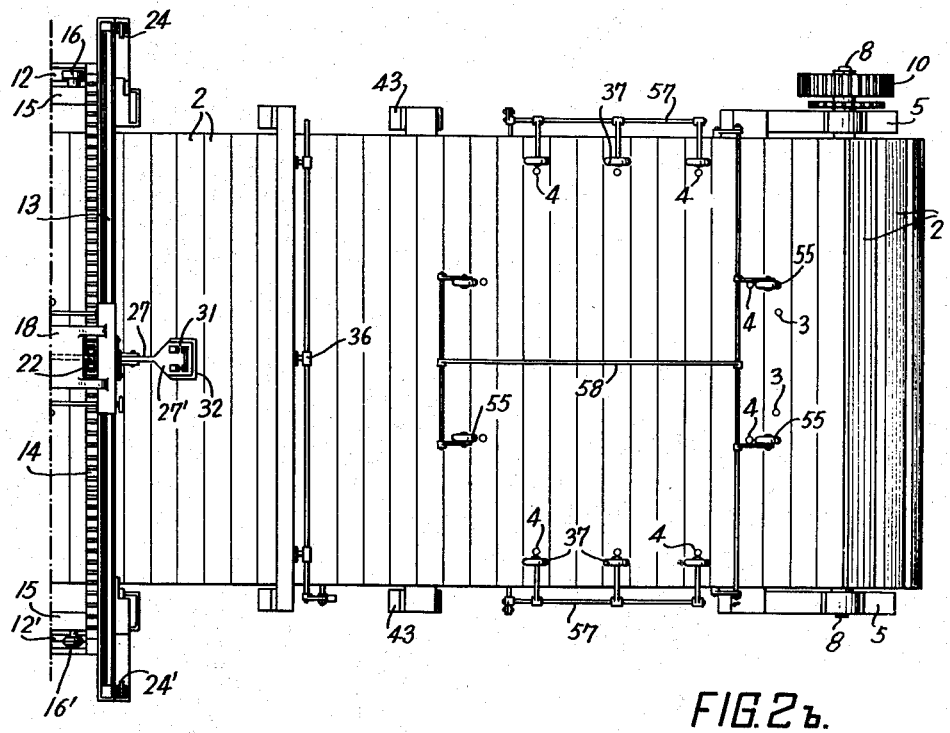
Figure 3:
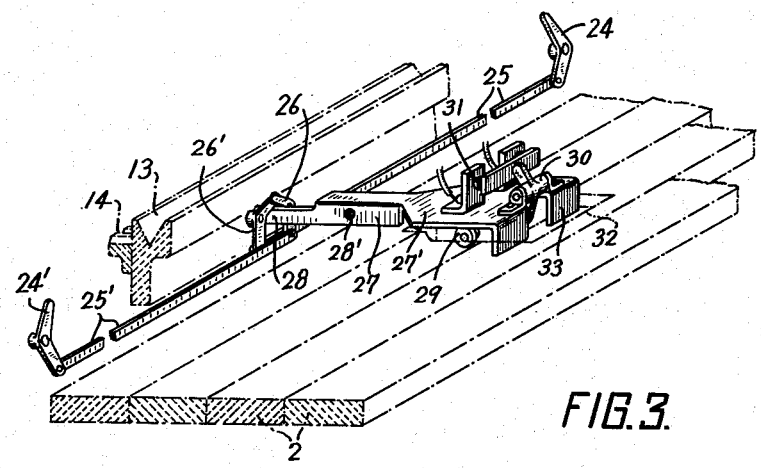
Fig. 3 is a partial perspective view showing the relationship between the conveyor, the guide frame and the engaging lever.

Referring to the drawings, the endless conveyor for the automatic glass cutting or scoring apparatus for cross cutting is composed of conveyor chain 1, each link of which possesses a flat wooden plate 2, the said conveyor being designed to make a straight advancement without showing any lateral shaking in keeping a normal horizontal position during its travel. In each section of the conveyor, small holes 3 and 4 are provided through wooden plates at fixed positions, accommodating stop pin 3' and the like capable of moving up and down therein respectively. Those stop pins are hidden in the holes of the wooden plates usually, and designed to make themselves appear out of the holes of wooden plates, if desired. Thus, the stop pin 3' in the small hole 3 projecting therefrom serves as a ruler for stopping glass plate to be cut at the predetermined position, while the stop pin in the small hole 4 serves to trim off the edge portions projecting therefrom.

The conveyor chain, which is moved intermittently, is passed around sprocket wheels 38 and 38' carried on the main shafts 8 and 9 journalled in suitable bearings on the frameworks 5 and 7. The main shaft 8 equipped with a gear wheel 10 may be rotated from electric motor provided with reduction gear (which is not shown in the drawing).

To both frame works 6 are secured slide rests 11 and 11' for a guide frame, which is provided with slide grooves 12 and 12' of channel and V-shape respectively. Along a part respectively of front and rear portions of upper surfaces of those two slide rests 11 and 11' is mounted at the right angle to said slide rests a guide frame formed in a rectangular shape, consisting of two guide rails 13 and 13' provided with rack bars 14 and 14' along inside walls and having slide surfaces of V-shape and channel shape respectively on upper surfaces thereof, the bottom end portions of said guide rails being connected with connecting bars 15 and 15'. Small rollers 16 and 16' respectively of a drum and rhombic forms in section provided on both front and rear outsides of said two connecting bars 15 and 15' are brought to roll respectively on the slide grooves 12 and 12' of said slide rests 11 and 11' so as to enable the guide frame to slide a small distance back and forth. On the other hand steel ropes 39 and 39', each one end of which is attached to one of the rear ends of connecting rods 15 and 15' of the said guide frame, are passed over the rolls 19 and 19' providing a parting from the slide rests 11 and 11'. The guide frame is always kept in the rear position by the counter weights 17 and 17' at the extreme ends of said ropes 39 and 39'.

On the guide frame is slidably mounted a slide bed 18 for cross cutting which slides on both front and rear sides of guide rails 13 and 13' at the right angle to the direction of travel of conveyor. Further, on this bed 18 is installed an electric motor 20, and a rotating shaft 21 extending longitudinally under said bed 18 is rotated by means of the reduction gear of said electric motor 20. Simultaneously pinions 22 and 22' carried on both ends of shaft 21 are brought to mesh with rack bars 14 and 14' on inner sides of the above mentioned guide rails 13 and 13' to move the bed 18 to the left and right. The electric motor 20 may be stopped by the action of limit switch 34 provided at the end portion of guide rail 13'.

To the carriers 40 for glass cutting tools provided on both right and left hand sides of the slide bed 18 for cross cutting by scoring are secured any suitable number, for instance, one or several of the glass cutting tools 23 for cross cutting capable of changing their position freely and simultaneously of ascending and descending. Such tools are usually held at elevated position, and the glass cutting tools of one desired side are lowered for cross cutting by scoring when cutting is to be made. And impact pieces 24 and 24' are pivoted on both outer ends of the front guide rail 13, the one arm of said impact piece 24 or 24' being connected with the one arm of turning member 26 and 26', respectively, pivoted in the middle of the guide rail 13 respectively by connecting bars 25 and 25'. When the bed 18 reaches either the left or the right extremity of sliding, the projection of slide bed 18 strikes the other free arm of impact piece 24 or 24', and causes it to swing outwards. By this action the turning member 26 or 26' is turned by means of the connecting bar 25 or 25'. The other arms of these two turning members 26 and 26' are capable of actuating the engaging lever 27 corresponding to the action of connecting bars 25 and 25' in engaging with the reduced rear end 28 of the engaging lever 27 which extends longitudinally in front of the guide rail 13 and is pivoted thereto at its end through a pair of brackets and a pin 28'. The engaging lever 27 rolls on the conveyor always with its rollers 29 provided on the lower side of the forehead portion 27' of said lever. The front end of said forehead portion 27' is bent downwards at right angle to form a bent portion 33. On the said forehead portion 27' is pivotally attached a swing member 30, of which lower lug is positioned at the back of a groove at the middle of the bent portion 33. Then, the conveyor is stopped by a mechanism not shown in the drawing, just when the forehead portion 27' of said engaging lever 27 is about to fall in a recess 32 of the conveyor. In the course of slow movement of the conveyor due to inertia of the conveyor being stopped, the bent portion 33 of aforesaid engaging lever 27 bumps mildly against the rear edge portion of said recess 32 and simultaneously the lower projection of the said swing member 30 strikes said rear edge portion. Concurrently therewith, the limit switch 31 is operated by the action of the upper lug of swing member 30, and thus the electric motor 20 on the slide bed 18 for cross cutting equipped with the cross cutting device is driven for performing the cross cutting operation.

In the present invention, when the glass plate to be cut is loaded by means of the glass plate loading device 35 on the conveyor, and when the glass plate rested against the tilting frame of loading device is first loaded, as it is, on the conveyor by the rotation of loading device, the glass plate to be cut is loaded on the conveyor at the loading position in holding its tip at the predetermined position by the ruler stop pins 3' projecting through the small holes 3 provided at a fixed position by means of a suitable mechanism. Then, the glass is carried on the conveyor forwards and under the cross cutting device, when the bent portion 33 of forehead portion 27' of engaging lever 27 falls in the recess 32 of conveyor, and the said bent portion 33 strikes softly at the said recess 32, and simultaneously the lower lug of the swing member 30 collides with the rear edge portion of recess 32 and concurrently the upper lug of said swing member actuates the switch 31, which sets in drive the electric motor 20 and simultaneously stops the main prime mover, and consequently the conveyor being stopped by other mechanism not shown in the drawings. There exists some time lag from starting of the electric motor to stop of the main prime mover. In consequence, even after the main prime mover has stopped, the guide frame advances a small distance before its stopping, because the engaging lever 27 is brought to engage with the rear edge portion of the recess 32 of conveyor, during the slow movement of conveyor due to its inertia on the stopping.

The slide bed 18 for cross cutting which has started the forward movement holds the glass cutting tool 23 on the other side at an elevated position, while the cutter 23 on the other side is lowered, thus the cross scoring being carried out by making score on the glass plate to be cut in the traverse movement of bed. In a further movement of bed 18, the lever of the change-over switch 34 for the conveyor is struck and simultaneously the switch of electric motor 20 is changed over. Consequently, the electric circuit is closed and at the same time the foremost end of said bed causes the impact piece 24 or 24' to swing, whereby the turning member 26 or 26' is actuated, as above described, by the connecting rod 25 or 25' and with a result the reduced rear portion 28 of the engaging lever 27 is pushed downwards. When the bent portion 33 of the said lever is raised as a fulcrum the pin 28', the former is disengaged from the recess 32 of conveyor, the guide frame is drawn back to the original position by the pulling action of the balancing weight 17 and 17' at the extreme end of the steel rope 39 and 39'. Then, the starting switch for the main prime mover is actuated; the conveyor is set in its travel; the glass plate which has been traversely scored moves forwards as being on the conveyor to the subsequent longitudinal cutting or scoring position, where the longitudinal scoring is made with the descending glass cutting or scoring tool 36 for longitudinal scoring, which has been perviously provided. The head 18, i. e., the slide bed 18 travels the limit of its travel transversely to the right or left extreme ends while making a score on the glass sheet to be cut. No sooner does the slide bed 18 reach, for instance, the right extreme end, than it pushes and actuates the lever of the change-over switch 34 in the circuit of the conveyor on one hand and strikes the impact piece 24 on the other hand; simultaneously the bed stops. Consequently, by operating the switch 34 the circuit of the conveyor is closed so that the conveyor which was stopped up to the present begins to run and at the same time, due to the action of the impact piece 24 which was moved rearwardly by the slide bed 18, the turning member 26' is pushed down by the operation of the connecting lever 25, which causes the rear end 28 of the engaging lever 27 to be pushed downwardly. When the rear end 28 of said engaging lever 27 is lowered or pushed down, it becomes possible for the forehead portion 27' of the lever 27 to be raised. Thus, the forehead portion 27' of the engaging lever 27 is disengaged from the recess 32 on the conveyor and the conveyor moves on. On the other hand, the conveyor is started through the operation of the change-over switch 34 in the circuit of the motor 20 at the moment the lever of said switch is actuated by the slide bed 18. While the conveyor is advancing while the forehead 27' being raised, the forehead portion 27' of the engaging lever 27 descends on the conveyor as a fulcrum the pin 28' due to its own weight so that the rollers 29 provided under side of the forehead portion 27' roll on the conveyor as the conveyor advances.

Now, immediately after the bent portion 33 of the forehead portion 27' of the engaging lever 27 falls in the next recess 32 of the conveyor in the course of the movement of the conveyor, the bent portion 33 engages with the rear edge of the recess 32 and concurrently therewith the switch 31 is operated by the abutment of the lower lug of the bent portion 33 with the rear edge of the recess, so that the motor 20 located on the slide bed 18 is driven; thus the slide bed 18 which had stopped at the right extreme end of the guide rails 13 and 13' begins to travel toward the left side in the reverse direction, while making a score on the glass sheet by the cutting tools 23. On the other hand, when the bent portion 33 of the engaging lever 27 falls in the recess 32 of the conveyor the latter advances a short distance due to its inertia while being in engagement; the guide frame rides at both sides on the slide rests 11 and 11', by cooperation of grooves 12 and 12' of channel-shape and V-shape provided at both front and rear ends of the slide rests 11 and 11' with smaller rollers 16 and 16' provided respectively on both front and rear sides of connecting bars 15 and 15' of the guide frame. Counterweights 17 and 17' are attached respectively to each one end of steel ropes 39 and 39', whereby the guide frame is effectively maintained, even when the conveyor advances a small distance due to its inertia. In this way the guide frame is accurately positioned with respect to the conveyor.

Thus, the conveyor and the guide frame stop always at a constant relative position with respect to each other; thus the relative position between the glass plate loaded at the predetermined position on the conveyor and the glass cutting or scoring tool for the cross cutting is always kept constant, whereby the cross cutting is always carried out in an accurate cutting position with respect to the glass plate to be cut.

In the next place, as heretofore described the glass plate scored traversely and longitudinally with traverse and longitudinal scoring or cutting tools respectively is cracked off or trimmed off the left and right edge portions and also front and rear edge portions, if necessary, of said glass automatically by means of the crack off device or trimming off device in the crack off section.

Figure 4:
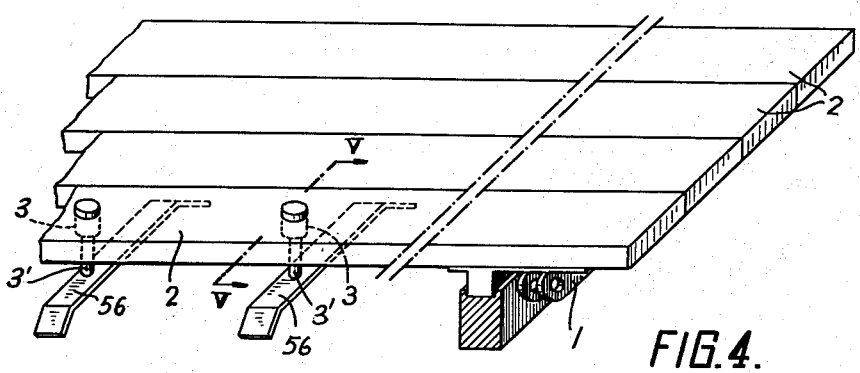
Fig. 4 is a partial cross sectional view on the line IV—IV of Fig. 2.
Figure 5:
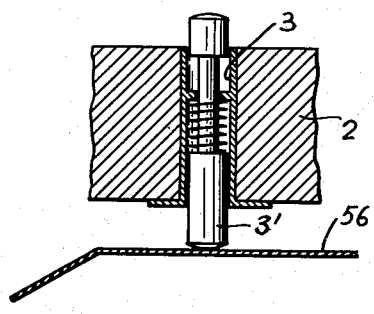
Fig. 5 is a part sectional view on the line V—V of Fig. 4.

Such a cracking off or trimming off operation is carried out as in the following manner:

The chain wheel 45 carried on the shaft journalled in bearings at the elbows 44 of the cradles 43 on both sides of the conveyor is brought to rotation by a chain belt from the chain wheel carried on the shaft 41, to which shaft 41 is also secured a sprocket wheel 42 which meshes normally with the conveyor chain 1. Consequently, as the conveyor advances the sprocket wheel 42 is driven by the chain 1 of the conveyor. And at the same time, the cam 46 provided on the shaft of said chain wheel 45 engages with roller 47 carried by a swing bar 48 which is pivoted at its bottom to the elbow 44, thereby the cam 46 is capable to actuate the swing bar 48 and simultaneously by the action of said swing bar 48 are actuated the connecting rod 49 and the one arm of the lever 51 pivoted to the bracket 50 mounted on the frame work as well as the short arm 52' pivoted to the bar 52 the one end of which is pivotally secured to the said connecting bar 49. Further, by this associating motion, pressing down rollers 55 and 37 carried respectively by the connecting rods 58 and 57 apply a pressure to glass surface on the conveyor respectively, and at the same time, the stop pins 3' are raised with their bottom along an inclined face of a band-shaped plate 56 for lifting the pins having inclined portions, for instance as shown in Fig. 4, and projected so as to push against the glass plate from below, thereby inutile edge portions are trimmed off or cracked off along the scored lines on the glass surface.

Moreover, the switch for starting of an electric motor for cross cutting or scoring and the main prime mover may be provided, for instance, at any suitable position excepting at the engaging lever for a similar operation as above.

Thus, according to the invention, just before the conveyor stops, the guide frame provided with the cross cutting device frame comes to stop after it has travelled for some distance in conjunction with the conveyor. Therefore, the relative stopping position of the conveyor and guide frame coincides always with each other and consequently the relative position between the glass plate loaded in a fixed position by means of the ruler stopping pins and the glass cutting tool for cross cutting or scoring becomes always constant. Hence, the glass cutting tool for cracking off edge portion may be eliminated, or the edge portions to be cracked off or trimmed off may substantially be neglected, or such edge portions may be reduced to a minimum. In consequence, an economical cutting of glass plates is enabled.

I have described a preferred embodiment of my invention, but it is understood that this disclosure is for the purpose of illustration and that various omission or changes in shape, proportion and arrangement of parts, as well as the substitution of equivalent elements for those, herein shown and described, may be made without departing from the spirit and scope of the invention as set forth in the appended claims.

What I claim is:

1. In an automatic glass cutting apparatus for cross cutting, a stop device comprising a conveyor adapted to be loaded at a predetermined position with glass plate being cut, means moving said conveyor intermittently, a guide frame, a slide bed mounted on said guide frame, a cross cutting device having cutting tools and connected with said slide bed, said frame being of rectangular shape and comprising front and rear guide rails having a rack bar along the inside thereof and connecting bars connected substantially at right angles with said guide rails, slide rests having sliding grooves formed therein, rollers carried by said connecting bars and projecting from the outside thereof, said rollers sliding in said grooves, whereby the guide frame is caused to advance for a small distance by the inertia when the conveyor stops, impact pieces having arms and pivoted to both outer ends of the front guide rail of said guide frame, turning members having arms and pivoted in the middle of said guide rail, and connecting members connecting respectively arm of each of said impact pieces with an arm of each of said turning members, said connecting members being adapted to be actuated by the swing action of the other arm of the impact pieces as soon as a projection of slide bed strikes said other arm of the impact piece during the travelling of the slide bed and causes said arm to swing.

2. In an automatic glass cutting apparatus for cross cutting, a stop device comprising a conveyor adapted to be loaded at a predetermined position with glass plate being cut, means moving said conveyor intermittently, a guide frame, a slide bed mounted on said guide frame, a cross cutting device having cutting tools and connected with slide bed, said frame being of rectangular shape and comprising front and rear guide rails having a rack bar along the inside thereof, and connecting bars connected substantially at right angles with said guide rails, slide rests having sliding grooves formed therein, rollers carried by said connecting bars and projecting from the outside thereof, said rollers sliding in said grooves whereby the guide frame is caused to advance for a small distance by the inertia when the conveyor stops, impact pieces having arms and pivoted to both outer ends of the front guide rail of said guide frame, turning members having arms and pivoted in the middle of said guide rail, connecting members connecting respectively an arm of each of said impact pieces with an arm of each of said turning members, an engaging lever having a rear end which extends longitudinally in front of said front guide rail, means pivotally attaching said lever to said front guide rail, said lever being adapted to be actuated by engagement with the turning member and further comprising a forehead portion having a downwardly bent portion, and a swing member pivoted on said forehead portion.

3. In an automatic glass cutting apparatus for cross cutting, a stop device comprising a conveyor adapted to be loaded at a predetermined position with glass plate being cut, means moving said conveyor intermittently, a guide frame, a slide bed mounted on said guide frame, a cross cutting device having cutting tools and connected with said slide bed, said frame being of rectangular shape and comprising front and rear guide rails having a rack bar along the inside thereof and connecting bars connected substantially at right angles with said guide rails, slide rests having sliding grooves formed therein, rollers carried by said connecting bars and projecting from the outside thereof, said rollers sliding in said grooves whereby the guide frame is caused to advance for a small distance by the inertia when the conveyor stops, impact pieces having arms and pivoted to both outer ends of the front guide rail of said frame, turning members having arms and pivoted in the middle of said front guide rail, connecting members connecting respectively an arm of each of said impact pieces with an arm of each of said turning members, an engaging lever having a rear end which extends longitudinally in front of said front guide rail, means pivotally attaching said lever to said front guide rail, said lever being adapted to be actuated by engagement with the turning members and further comprising a forehead portion having a downwardly bent portion, a swing member pivoted on said forehead portion and having an upper lug and a lower lug extended backwardly of said bent portion, said conveyor having a recess formed thereon, said forehead portion of the engaging lever engaging said recess, a motor for the slide bed, and a switch for starting and stopping said motor, said switch being adapted to be actuated by the upper lug of the swing member.

4. In an automatic glass cutting apparatus for cross cutting, a stop device comprising a conveyor, a guide frame having a front guide rail and a connecting member connected with said front guide rail; a slide bed mounted on said frame, an engaging lever having a rear end which extends longitudinally in front of the front guide rail, means pivotally attaching said lever to said rail, means actuating said lever by engagement with said slide bed, said lever having a forehead portion provided with a downwardly forehead portion, a swing member pivoted on said bent portion and having a lower lug extended backwardly of the bend portion, said conveyor having a recess formed therein in which falls the forehead portion of said engaging lever, a motor for the slide bed, and a switch for starting and stopping said motor, said switch being adapted to be actuated by the swing member whereby as soon as the glass plate is fed under a cross cutting position by the travel of the conveyor and the bent portion of the engaging lever drops into said recess, the lower lug of the swing member bumps against the rear edge of said recess.

5. In an automatic glass cutting apparatus in combination with a cross cutting device, a stop device comprising a conveyor, a guide frame having a front guide rail and a connecting member connected with said front guide rail; a slide bed mounted on said frame and supporting said cutting device, an engaging lever having a rear end which extends longitudinally in front of the front guide rail, means actuating said lever by engagement with said slide bed, said lever having a forehead portion, said conveyor having a recess formed thereon in which falls the forehead portion of said engaging lever when the glass plate proceeds to travel with the conveyor is fed into a cross cutting position, and a motor for the slide bed and the cross cutting device, and a switch for controlling said motor, whereby the guide frame is caused to proceed for a short distance by the inertia of the conveyor at the time of its stopping as the forehead portion of the engaging lever drops into said recess, and whereby the conveyor and the guide frame always stop at a constant relative position with respect to each other.

References Cited in the file of this patent

UNITED STATES PATENTS

| | | |
|---|---|---|
| 1,999,593 | Owen | Apr. 30, 1935 |
| 2,033,188 | Drake | Mar. 10, 1936 |